United States Patent [19]
deAngelis

[11] Patent Number: 5,398,193
[45] Date of Patent: Mar. 14, 1995

[54] METHOD OF THREE-DIMENSIONAL RAPID PROTOTYPING THROUGH CONTROLLED LAYERWISE DEPOSITION/EXTRACTION AND APPARATUS THEREFOR

[76] Inventor: Alfredo O. deAngelis, 241 Freeman St. #1, Brookline, Mass. 02146

[21] Appl. No.: 110,144

[22] Filed: Aug. 20, 1993

[51] Int. Cl.⁶ .................. G06F 15/46; B29C 35/08
[52] U.S. Cl. .................. 364/468; 364/274.24; 264/241; 425/141; 395/119
[58] Field of Search ............ 364/468, 474.24; 395/118, 119, 120; 264/10, 22, 23, 25, 40.1, 239, 241; 425/135, 140, 141

[56] References Cited

U.S. PATENT DOCUMENTS

| | | | |
|---|---|---|---|
| 4,575,330 | 3/1986 | Hull | 425/174.4 |
| 4,665,492 | 5/1987 | Masters | 364/468 |
| 4,752,352 | 6/1988 | Feygin | 156/630 |
| 4,863,538 | 9/1989 | Deckhard | 156/62.2 |
| 5,121,329 | 6/1992 | Crump | 364/468 |
| 5,126,529 | 6/1992 | Weiss et al. | 219/121.6 |
| 5,182,056 | 1/1993 | Spence et al. | 264/22 |
| 5,236,637 | 8/1993 | Hull | 264/22 |
| 5,256,340 | 10/1993 | Allison et al. | 264/22 |
| 5,260,009 | 11/1993 | Penn | 264/40.1 |
| 5,263,130 | 11/1993 | Pomerantz et al. | 395/118 |
| 5,287,435 | 2/1984 | Cohen et al. | 395/118 |
| 5,303,141 | 4/1994 | Batchelder et al. | 364/149 |

*Primary Examiner*—Paul Gordon
*Attorney, Agent, or Firm*—Rines and Rines

[57] ABSTRACT

A method of rapid prototyping through controlled layerwise deposition and extraction involving the precision control of material subtractive or removal processes in conjunction with material additive processes wherein each layer is formed by selectively depositing and removing portions of the layers in accordance with corresponding software slices of a computer model of the prototype part, and with complementary support material included in the layers and ultimately removed when the complete part has been fabricated.

36 Claims, 12 Drawing Sheets

CONTINUOUS FILM MASK STOCK

DISCRETE FILM MASK STOCK

CONTINUOUS FILM MASK STOCK

DISCRETE FILM MASK STOCK

RADIAL DISCRETIZATION

GRID DISCRETIZATION

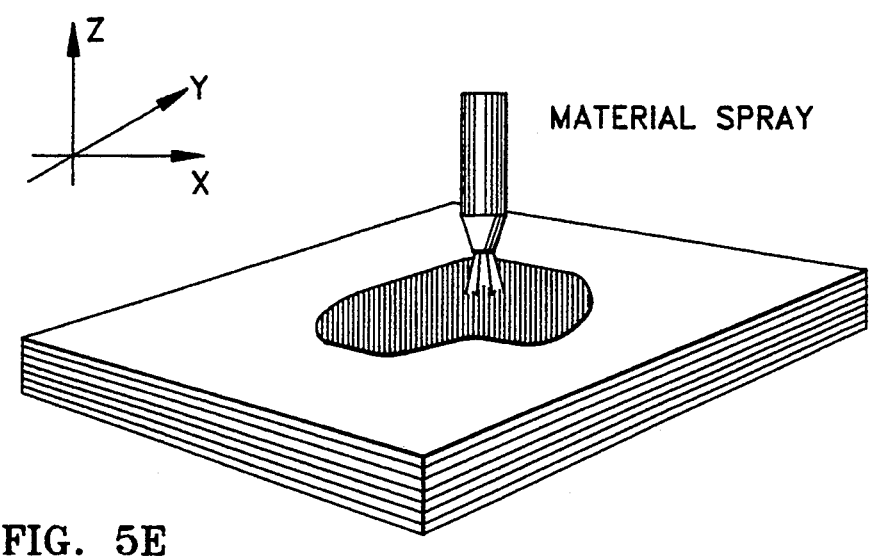
FIG. 5E
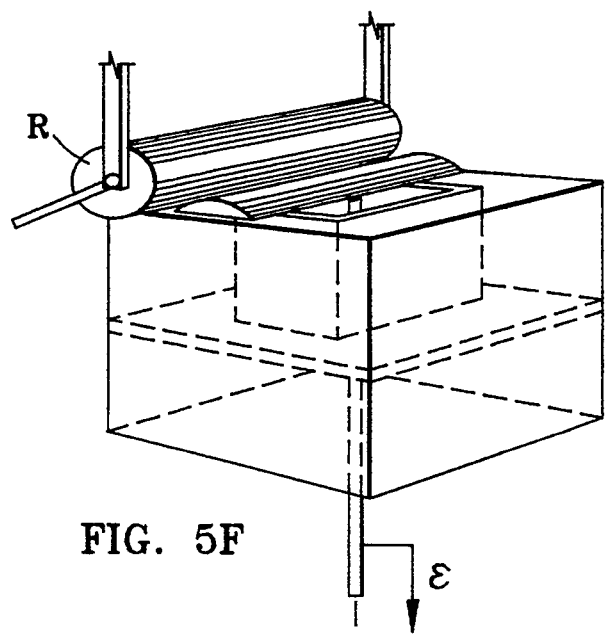
FIG. 5F
FIG. 5G
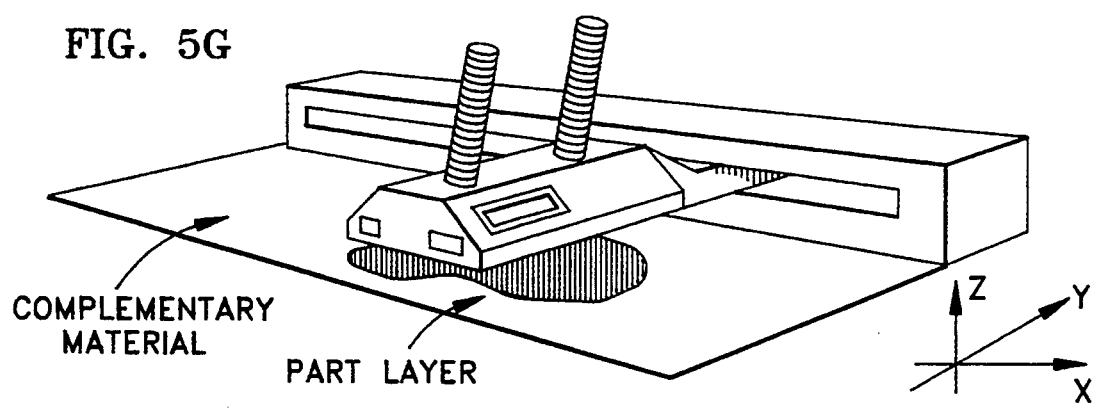

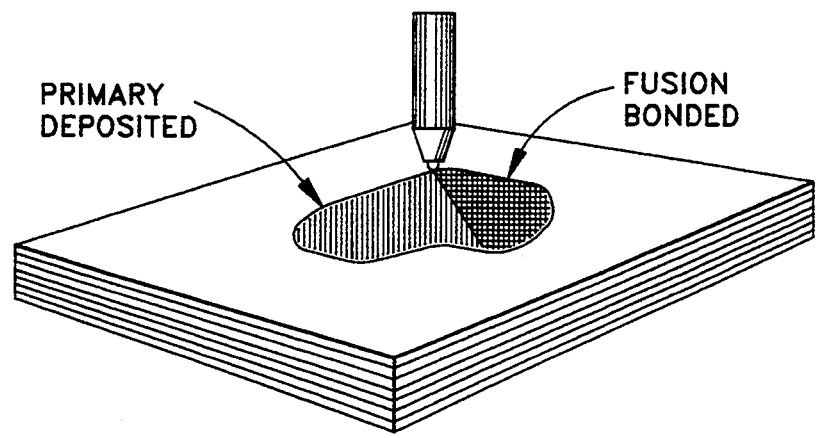
FIG. 5H
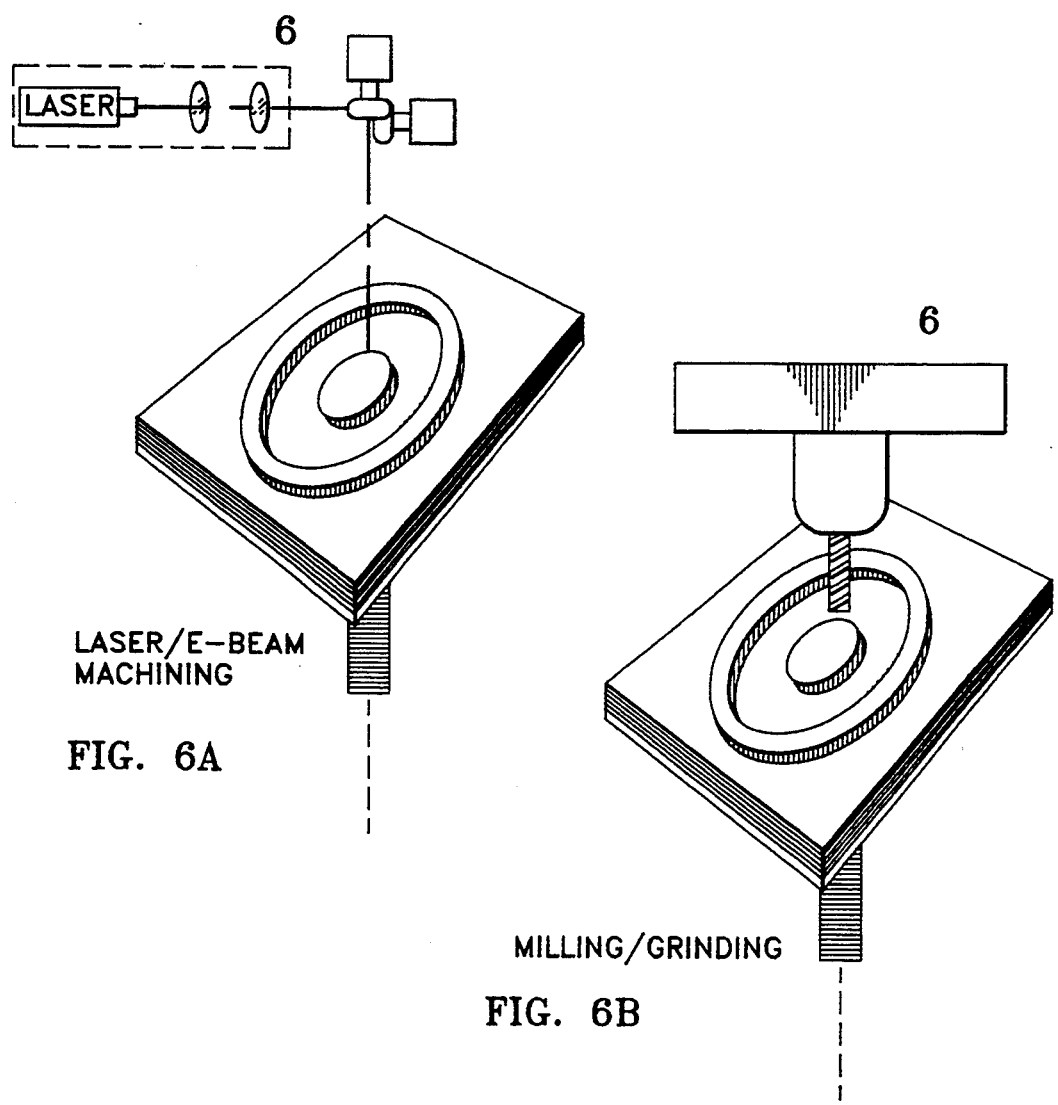
FIG. 6A
FIG. 6B

METHOD OF THREE-DIMENSIONAL RAPID PROTOTYPING THROUGH CONTROLLED LAYERWISE DEPOSITION/EXTRACTION AND APPARATUS THEREFOR

The present invention relates to methods of prototype construction and/or small quantity manufacture by controlled layerwise deposition and extraction.

BACKGROUND OF INVENTION

There is considerable interest within industry in manufacturing prototypes or small production batches in a rapid and cost, effective manner. Conventional part production methods are neither time nor cost effective when only a small number of units are needed because they require expensive part-specific tooling, setting up machining protocols, and generating and programming three-dimensional (3-D) tool paths which require much time and professional expertise. The cost and lime to set up and run machine-specific tooling, along with the initial capital costs for tooling, make conventional prototyping/small production run processes both time and cost intensive. Furthermore, conventional prototyping methods are limited in practice to simple part geometries. Complex parts involving inner features and cores/cavities are difficult to produce using conventional techniques and often require precision casting methods which are highly expensive, time consuming, and require a broad range of expertise.

Rapid Prototyping Systems (RPS) in the prior art, to a large degree, attempts to address the needs and problems mentioned above. A single automated system can be used to produce prototype parts and small production runs directly from engineering designs. Such a system is limited only by the size of the part and not by the intricacy oil the part geometry. Thus, such a machine is not so part-specific as conventional tooling, and a capital investment in such a machine is all that is needed to produce virtually any part within the size constraints of the system. Automated prototyping machines, furthermore, require a minimum of human expertise for successful operation and a relatively negligible amount of set up time for a particular part. Parts of complex geometries can be realized in relatively short amounts of time with significant benefit to industry especially where designs are changed frequently and prototypes or mock-ups are needed for design evaluation.

All such RPS make use of a common approach involving the stratification of the prototype. Software "slices" the prototype part geometry into a sequence of cross-sectional contours(strata) used to drive a materials processing system which recreates each contour out of prespecified materials. The prototype part is built up by adhering successive part cross-sections together until the part is complete.

Currently, there are several realizations of RPS, each employing a particular technology with its own strengths and weaknesses:

Stereolithography, referenced in U.S. Pat. No. 4,575,330 by Charles W. Hull;

Computer Aided Manufacturing Process and System (CAMPS), as described in U.S. Pat. No. 4,665,492 by William E. Masters;

Laminations Method, described in U.S. Pat. No. 4,752,352 by Michael Feygin;

Selective Laser Sintering (SLS), described in U.S. Pat. No. 4,863,538 by Carl R. Deckard;

Mask and Deposit (MD*) System, described in U.S. Pat. No. 5,126,529 by Lee E. Weiss.

Three Dimensional Printing, discussed in the Publication "Three Dimensional Printing: Form, Materials, and Performance", by Michael J. Cigna and Emanuel M. Sachs, Solid Freeform Fabrication Symposium, University of Texas at Austin, Austin Tex., August 1991.

Stereolithography produces part layers by scanning a laser across the surface of a photopolymer liquid bath and curing the photopolymer along the part contours. The precision is only limited by the boundary of photopolymerization initially, but as the parts continue curing in the post build stage, warpage becomes a limiting factor. The material properties of the parts are also limited by the material properties of photopolymers.

Selective laser Sintering (SLS) produces part layers by scanning powder with a high powered laser to induce sintering local to the laser path. While this process creates complicated geometries, the sintered material densities are low. Consequently, the mechanical properties of SLS parts are relatively unsuitable for functional prototypes. Increasing the density of SLS parts would require a higher degree of sintering/melting of the part powder, thereby compromising the geometric control provided by SLS.

Rapid prototyping by Precision Metal Spraying (Mask and Deposit),on the other hand, employs precision cut masks for each part layer and thus has the advantage of geometric control limited by the mask precision and/or the aspect ratio mask feature width-to-layer depth), notwithstanding any problems associated with mask/part material selection such as binding, warping, and mask melting. The intra/interlayer bonding in sprayed parts, however, is often primarily mechanical because the material particles are cooled before they hit the surface layer. Obtaining stress-free layers with desirable material properties involves significant tradeoffs with geometric control of the part.

Similarly, parts made by Ballistic Particle Manufacturing or InkJet Printing (CAMPS) must also trade off part quality with geometric control. The building of prototypes from welded or adhered precut laminations as in the Laminations Method, moreover, suffers from a tradeoff between inter-lamination bonding and geometric control, as well as from several precision handling problems associated with complicated part cross sections.

Lastly, 3-D printing systems deposit tiny binder material droplets onto a layer of powder, essentially precision printing each successive part layer. These systems, however, have the disadvantage of porosity (low density) and poor bonding in green parts (prior to oven baking) due to the fluid mechanics and physics of the printing and binding processes. Once the parts are oven heated to bake out the binder material, warpage and distortion related to shrinkage limit the attainable precision of the final parts.

All of the present rapid prototyping methods, therefore, unfortunately are subject to contain inherent difficulties and limitations in aspects of their prototype creation. In summary, the key disadvantages associated with one or more of the current systems are: (1) poor material properties and/or distribution of material properties; (2) poor geometric control and/or difficulty with complex geometry; and (3) trade off between geometric part control and interlayer bond strength and/or part properties, such as density or microstructure.

While each of the above prior processes is different, they all share a key element: each process is additive. That is, they all produce a 3-D part by incrementally adding material to built it up. Furthermore, the additive technologies which distinguish these processes all involve a tradeoff between maintaining a high degree of geometric precision and attaining suitable material properties in the final part.

In accordance with the present invention on the other hand, 3-D manufacturing by controlled layerwise deposition/extraction is a novel rapid prototyping method that integrates the precision control of established subtractive processes with additive processes optimized to produce desired material properties in order to produce a superior rapid prototyping system that does not suffer from any of the above mentioned shortcomings of prior art systems.

In the controlled layerwise deposition/extraction method of the invention, each layer is formed by selectively depositing part and complementary materials on the preceding layer (work surface). Complementary material surrounds the part material on each layer to provide such things as structural support, chemical and/or thermal integrity, and adhesion; such being chosen based on the specific materials and the specific implementation of the method. Systems for selective deposition of materials are generally based on the properties of the materials and will be discussed in more detail hereinafter. Part materials are extracted from the initial part contours produced by the deposition systems to arrive within specified geometric tolerance of the part material layer. Selective deposition and extraction of complementary materials cats be used to form control contours for the selective deposition of part materials. These control contours are used to guide the deposition system into producing near net shape part contours such that the amount of subtractive processing for the part material layer is reduced. Precut masks can be used as a form of control contour for selective deposition. By preforming masks from complementary materials and leaving them in place, the additive processing of complementary materials can also be reduced. The type of control contour and the level of precision in any control contour will be determined by the part and complementary materials, their respective area ratios over the work surface, and/or the particular embodiment of the method. In any case, each completed layer is an aggregate of part materials contours and complementary materials contours, the part materials contours being within prespecified geometric and material property tolerances and the remaining area of the aggregate layer (work surface) filled with complementary materials. By employing various deposition and extraction processes, and by maintaining strict control of the processing environment, the method for rapid prototyping of the invention may be used with many different materials including, for example, metals, alloys, thermoforming plastics, thermosetting plastics, ceramics, and salts. These different materials may be used simultaneously within the part.

OBJECT OF THE INVENTION

An object of the present invention, therefore, is to provide a new and superior method of automated manufacturing of prototypes and/or small quantities of items that, unlike prior art techniques based upon incrementally adding material to build up the item, with attendant requirements of a high degree of precision, uses the established and precise methods of subtractive processes in conjunction with additive processes optimized to attain specified material properties, to provide improved rapid prototyping that obviates shortcomings of such prior art techniques.

A further object is to provide novel apparatus for carrying out the novel method of the invention.

Still a further object is to provide such a new technique of controlled layerwise deposition/extraction wherein each layer is formed by selectively depositing and removing part and complementary materials from the current layer or work surface.

Other and further objects will be hereinafter described and more particularly delineated in the appended claims.

SUMMARY OF INVENTION

In summary, from one of its broader aspects, the invention embraces a method of automated layerwise fabrication of a three-dimensional part from a computer model, through controlled deposition and extraction of materials, that comprises, providing a three-dimensional computer model representation of the part and, by software, slicing the same into a plurality of successive layers corresponding to layers of predetermined thickness(es) of the part; generating sequences of part and complementary support material(s) contours corresponding to each layer; depositing material(s) for one or more contours onto a work surface within a processing enclosure; material(s) processing said deposited contour(s) in order to achieve prespecified material properties for part and complementary contours; removing portions of said material(s) from said contour(s) under the control of the computer model contour(s) corresponding thereto; repeating the depositing, processing, and removing as necessary under the control of the computer model corresponding to the layer to complete an aggregate layer comprising part material contours within prespecified geometric and material property tolerances and complementary material(s) elsewhere on the aggregate layer; completing the computer model sliced layer by further processing said aggregate layer such as machining off a sublayer to ensure thickness tolerances or toughening or chemically enhancing the surface to ensure selective binding to the next aggregate layer; repeating said controlled layer creation steps to build the entire part surrounded by the complementary material/s; and removing said complementary material/s to obtain the fabricated part.

Preferred and best mode embodiments and designs will hereinafter be described in detail.

DRAWINGS

The invention will now be described in connection with the accompanying drawings, FIGS. 1–8, which are schematic views of necessary steps in the procedure of a preferred embodiment of the invention;

FIGS. 1A and 1B are flow charts of the general operation of embodiments of the invention, effecting its method of layerwise controlled deposition/extraction, with and without precut masks respectively;

FIG. 1B allows for the first deposition to be part or complementary material;

Figure 3A:
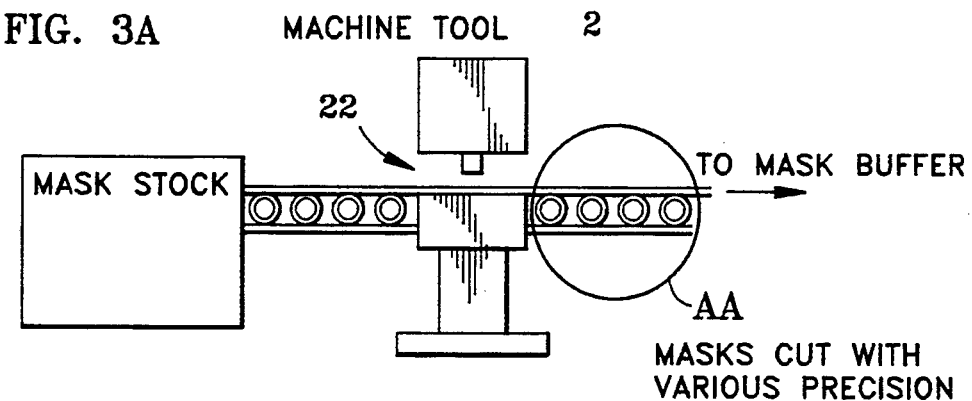
FIG. 3A illustrates suitable mask-formation apparatus where masks are to be used, with FIGS. 3B and 3C showing precut masks of different precision for continuous film stock and discrete film stock, respectively.
Figure 3B:
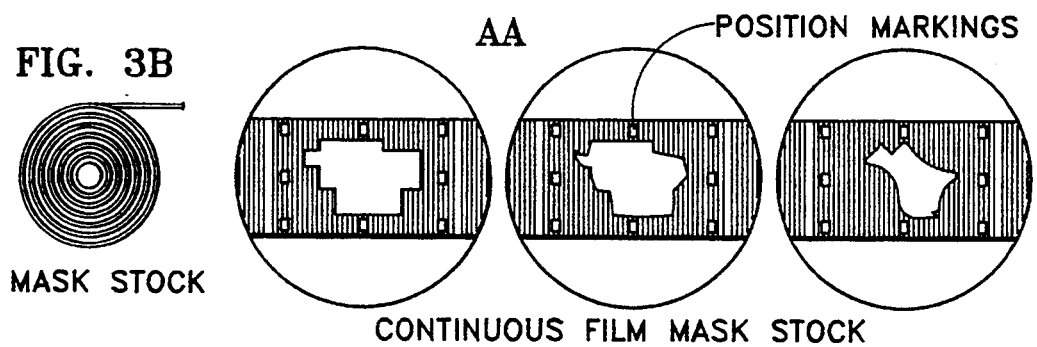
FIG. 3D illustrates concur factorization that can be used with masks.
Figure 3C:
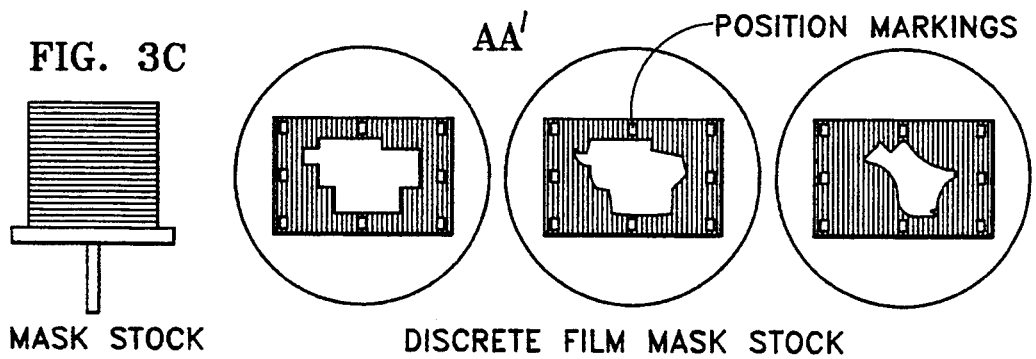
Figure 3D:
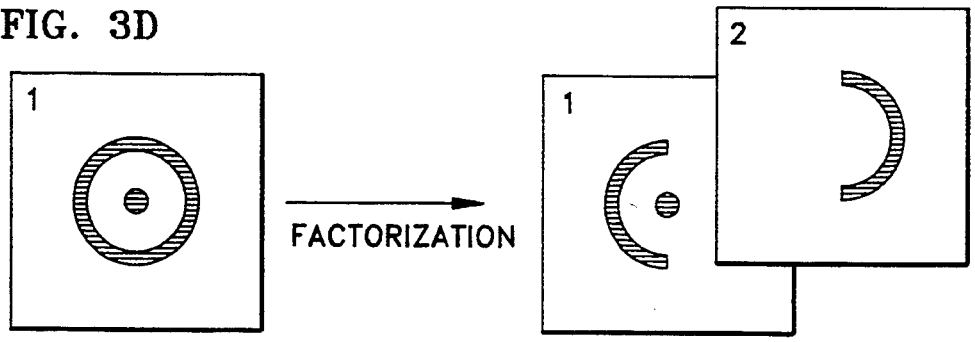
Figure 4:
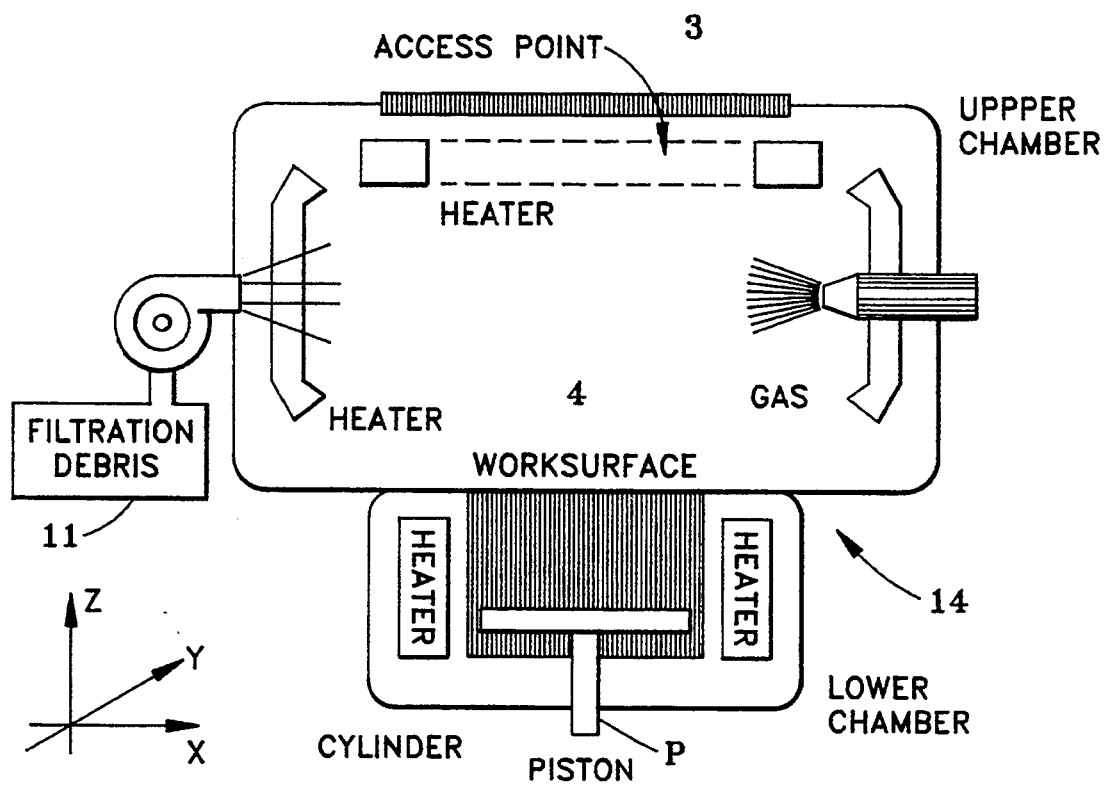
Figure 5A:
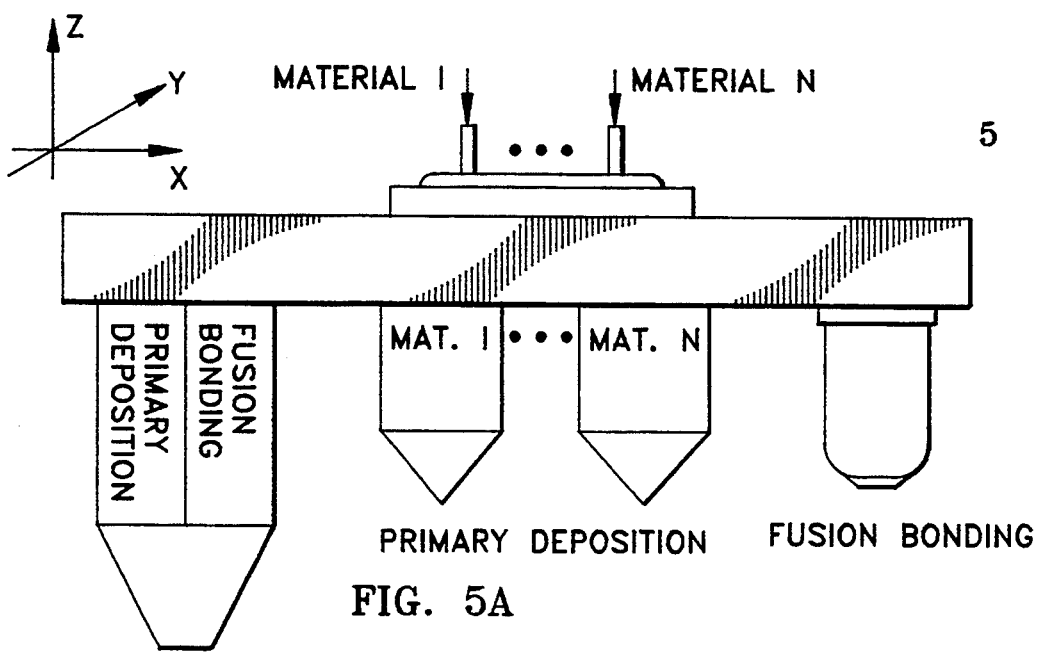
Figure 5B:
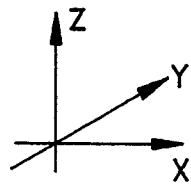
Figure 5C:
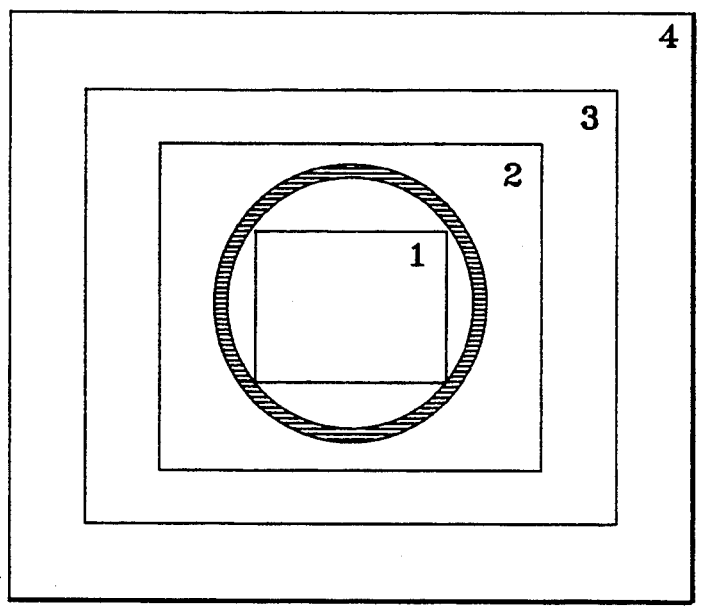
Figure 5D:
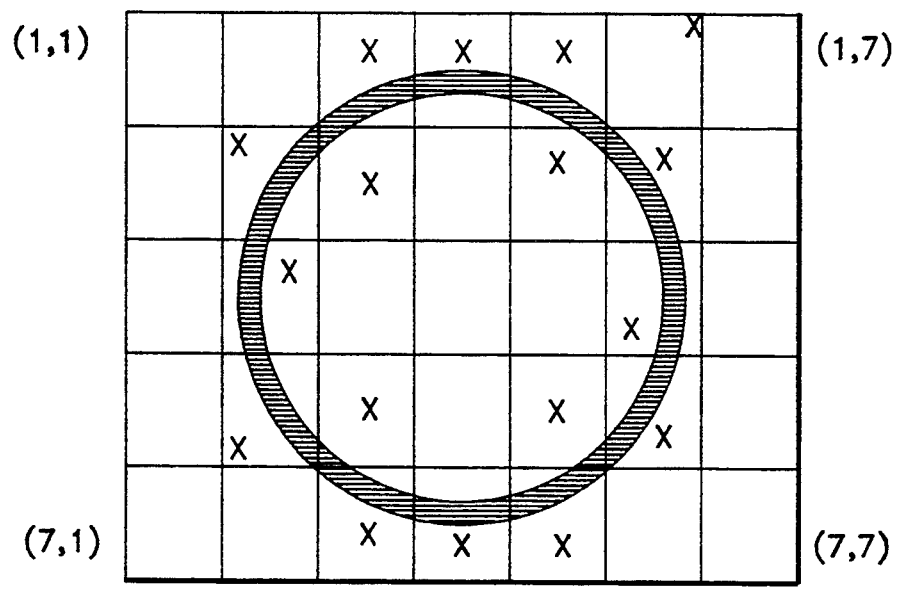
Figure 7:
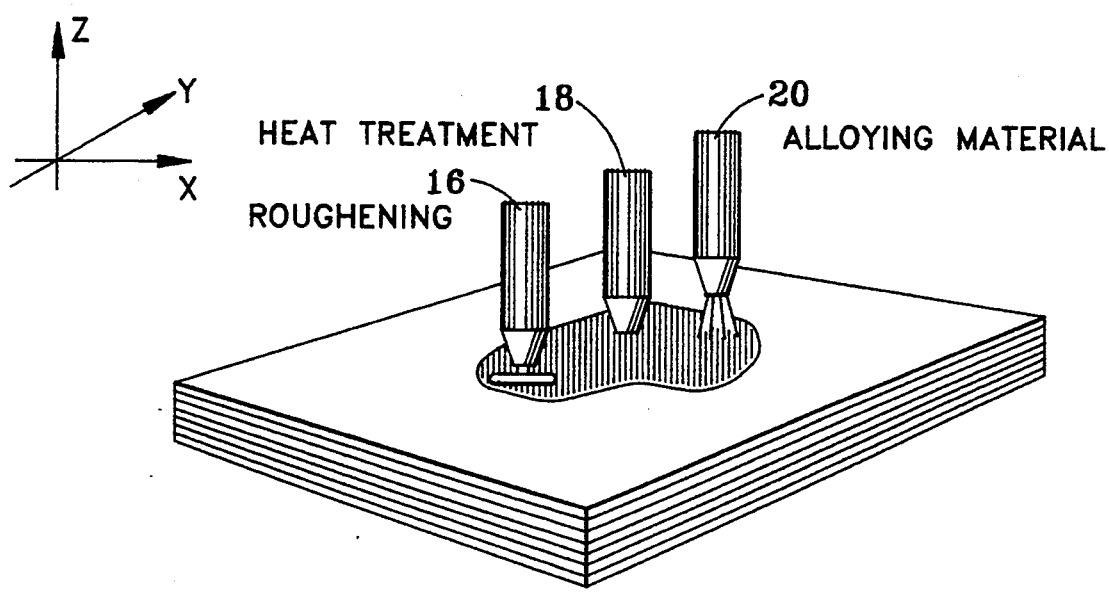
Figure 7A:
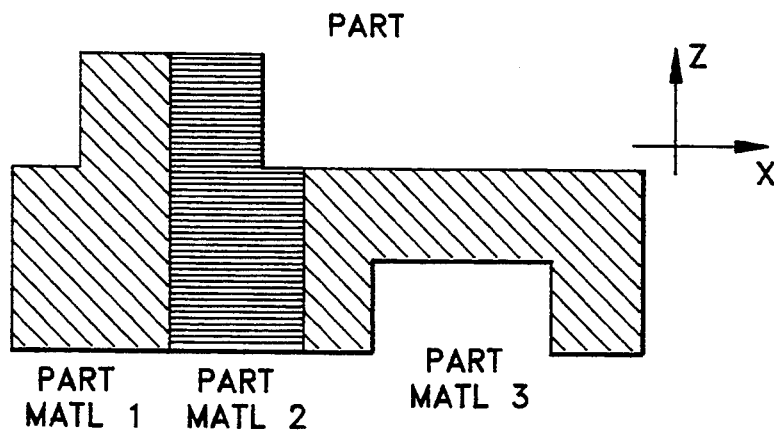
Figure 7B:
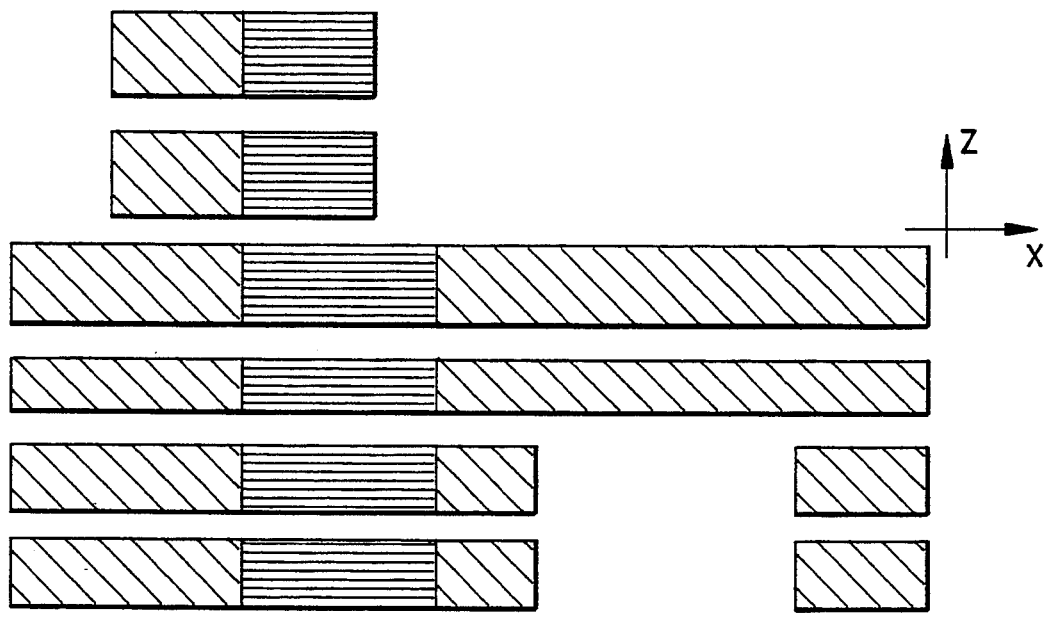
Figure 7C:
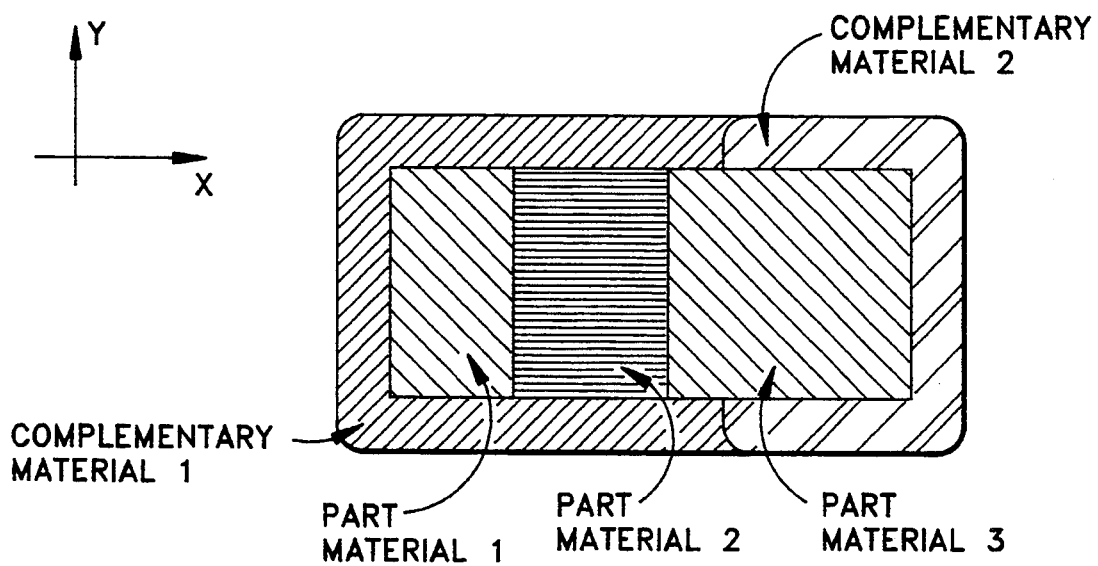
Figure 8A:
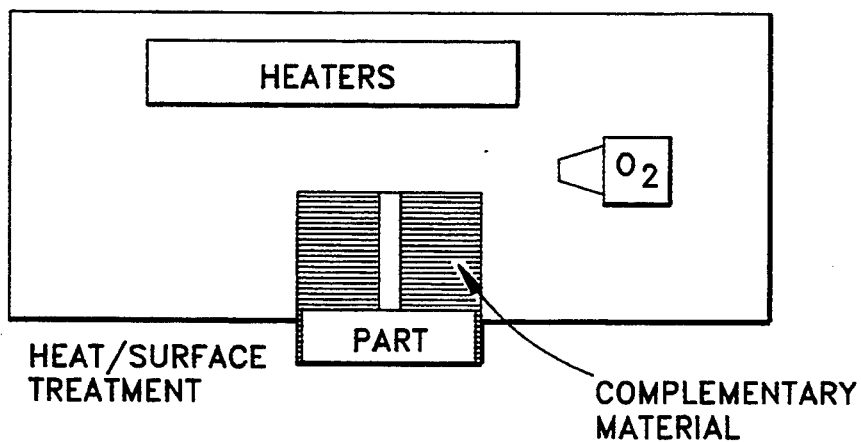
Figure 8B:
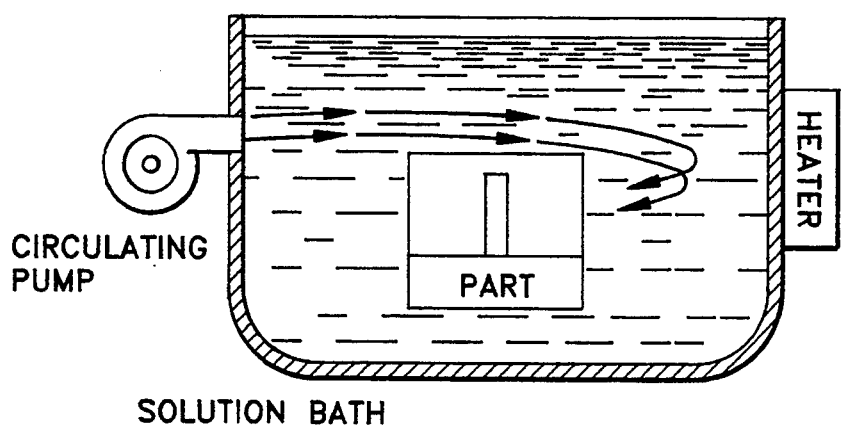
Figure 8C:
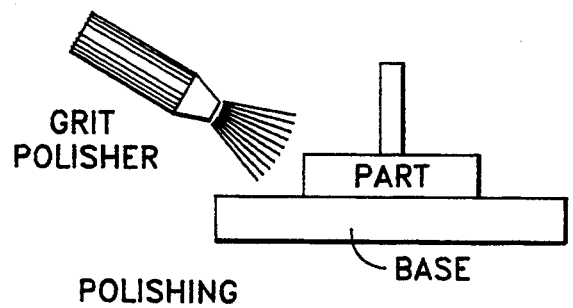

FIGS. 3E, 3F, and 3G and 3H, 3I, and 3J are modifications of respective FIGS. 3A–C;

FIG. 4 is a diagram of a suitable processing enclosure, work surface, and environmental control system; FIGS. 5A and 5B show part and complementary materials deposition and fusion bonding apparatus used in depositing, materials processing, and adhering the successive layers in the materials additive subsystem of the invention;

FIGS. 5C and 5D respectively diagram radial and grid type discretization of the layers for the deposition of material;

FIGS. 5E, 5F and 5G diagrams of the primary deposition step using material spray, powder dispensing, molten material dispensing, pre-cured resin dispensing, and sol gel dispensing;

FIG. 5H is a diagram of a fusion bonding apparatus for adhering the successive deposited layers and establishing desired material properties in the layer;

FIGS. 6A and 6B are views of laser/E-beam and milling/grinding materials subtraction, extraction, or removal in accordance with the invention;

FIG. 7 is a diagram of a suitable interlayer processing apparatus; FIGS. 7A, 7B and 7C show a part, the layered (sliced) part, and an aggregate layer corresponding to a particular part layer;

FIGS. 8A, 8B, and 8C illustrate part post-processing steps of heat and surface treatment, chemical bath treatment and polishing, respectively.

DESCRIPTION OF PREFERRED EMBODIMENT(S) OF INVENTION

Before proceeding to describe embodiments illustrating the method and preferred apparatus for carrying out the layerwise controlled deposition/extraction technique underlying the invention, a brief description of the general framework for such rapid prototyping is believed to be useful.

The main subsystems associated with such rapid prototyping by layerwise controlled deposition/extraction include (1) a computer and controls subsystem, (2) an optional maskforming subsystem, (3) a part chamber and work surface subsystem, (4) an environmental control subsystem, (5) a materials additive processes subsystem, (6) a materials subtractive processes subsystem, (7), a layer processing and prepping subsystem, and (8) a part post-processing subsystem.

This categorization is made according to purpose and not according to physical realization or placement, as some subsystems may be distributed throughout the apparatus.

Figure 1A:
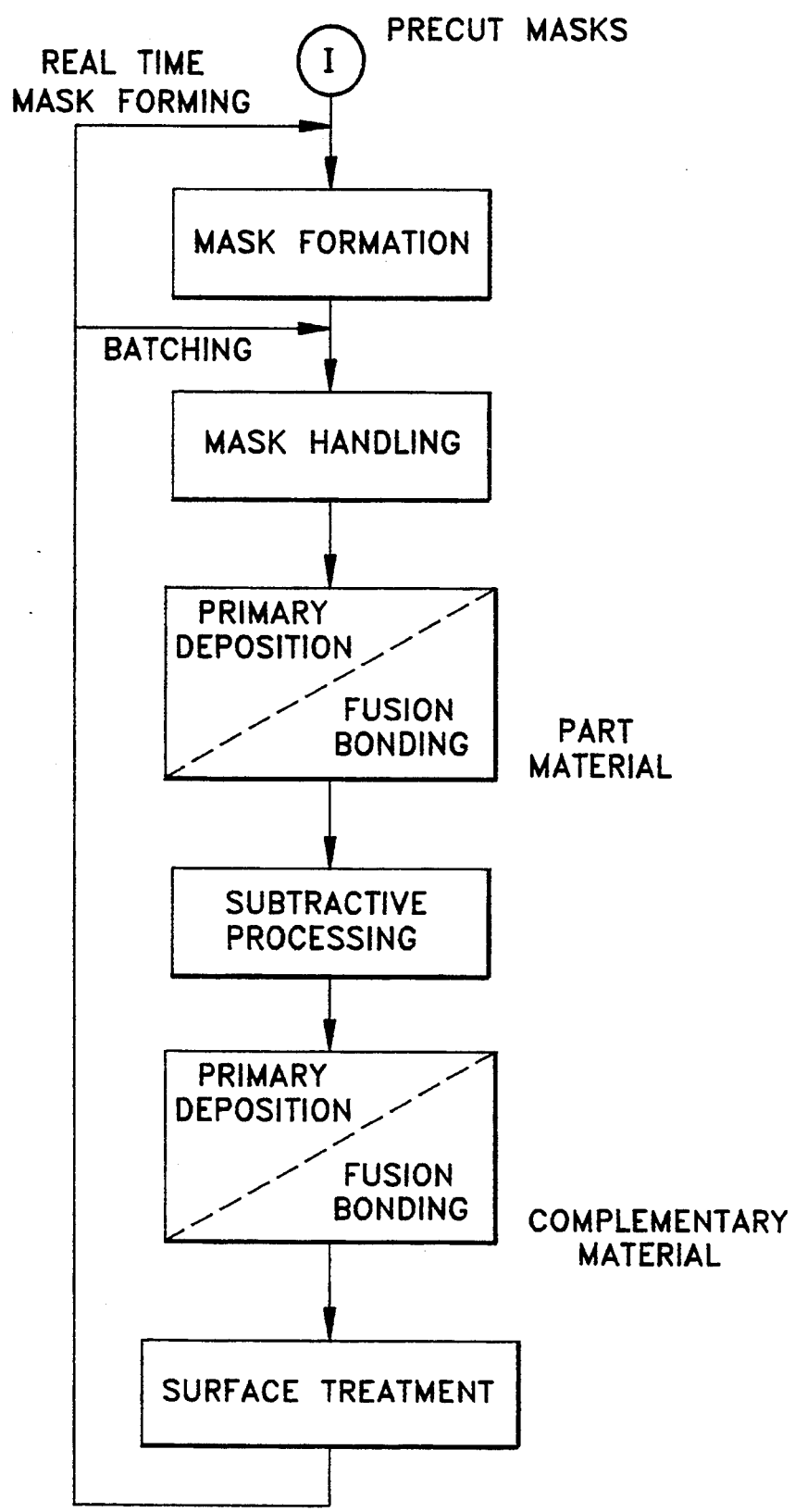
Figure 1B:
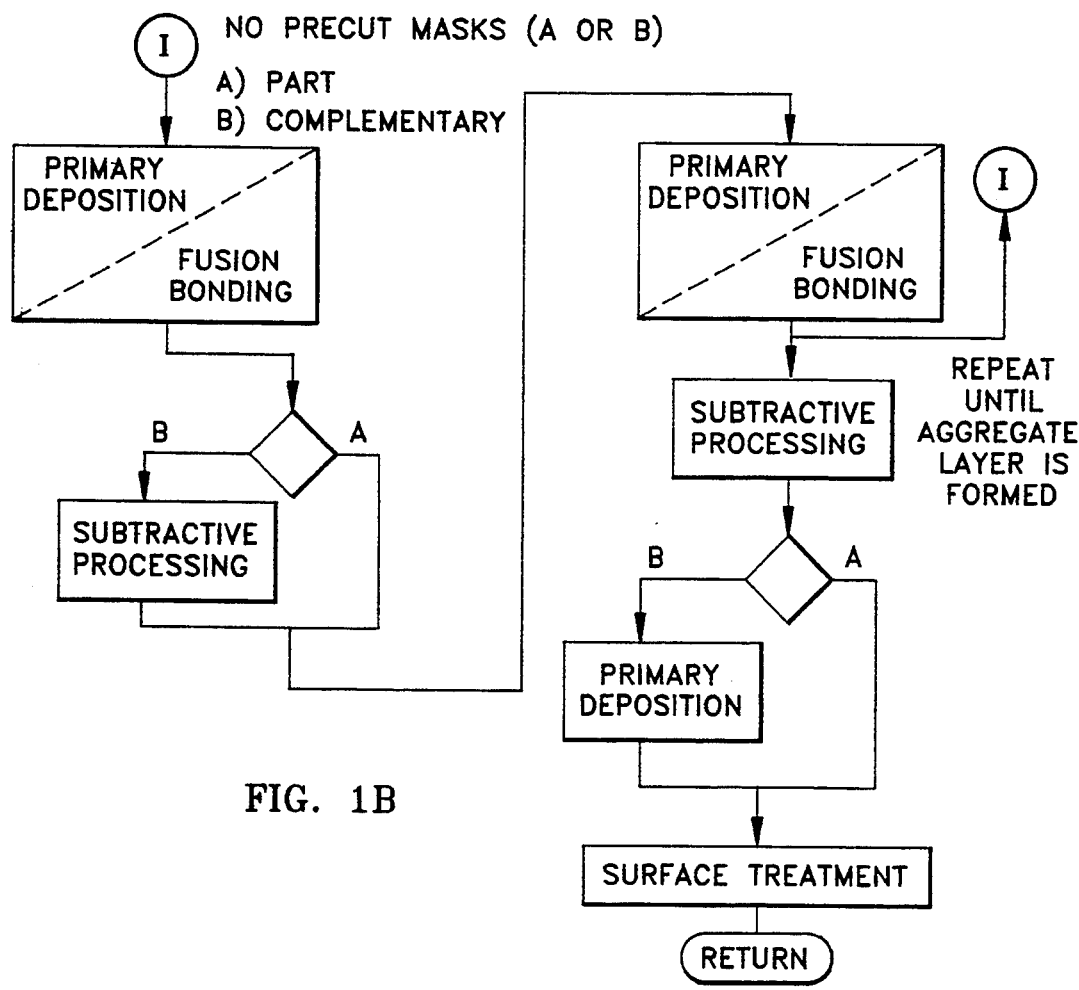

The flow charts of FIGS. 1A and 1B show the underlying 3-D controlled deposition/extraction (or removal or subtraction) processes of the invention and its various hereinafter described embodiments, employing precut masks and without precut masks, respectively.

Referring first to FIG. 1A, following mask formation in real time or in batch mode and "Mask Handling", so-labeled, the part material is applied by additive processing (primary deposition and then fusion bonding), such steps also being effected with the complementary material(s) (primary deposition and possibly fusion bonding), and with the deposited and bonded part material subjected to the subtractive processing of the invention, all as more fully described hereinafter. Following redeposition of complementary material in empty regions anti subsequent surface treatment, these steps are repeated for successive layers as indicated by the feedback lines from "Surface Treatment" to the "Mask Formation" and "Mask Handling" process step blocks.

When no precut masks are employed on the layered prototype or part build-up, FIG. 1B, the part material(s) and the complementary material(s) are again applied by primary deposition and then fusion bonding (routes A and B corresponding to part material(s) first and complementary material(s) first, respectively) followed by subtractive processing of the work surface, with repetition as at (1), until the aggregate layer; corresponding to a completed layer of the part is formed. Following "Surface Treatment", the process is repealed for successive layers.

(1) Computer and Controls Subsystem

Figure 2:
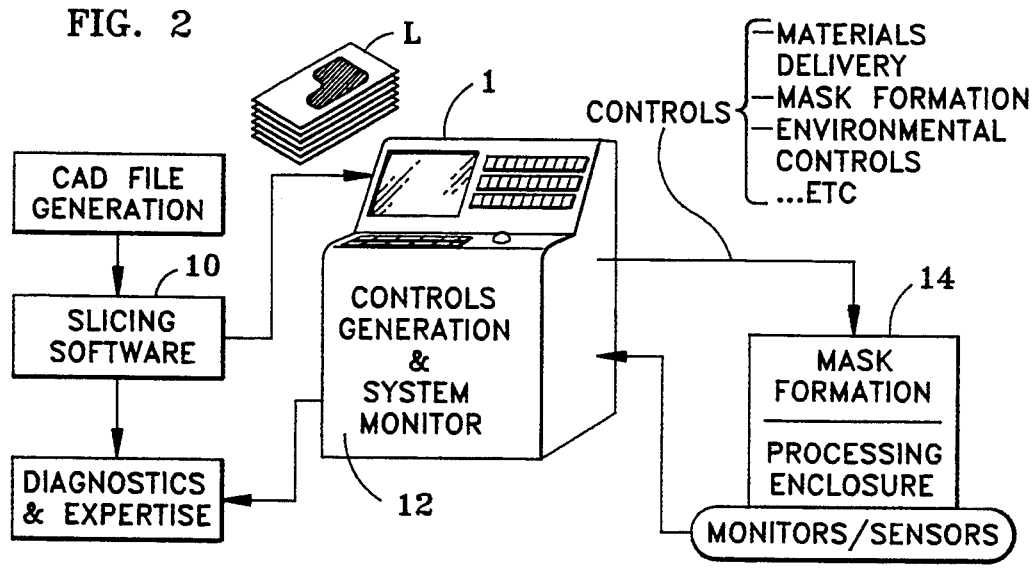
FIG. 2 is a block diagram of a preferred computer and controls subsystem for operating the apparatus and controlling the process or method of the invention.

The computer and controls subsystem 1, FIG. 2, interfaces with all other subsystems and the operator to initiate and control the rapid prototyping process. This subsystem takes in a CAD/CAM representation of the prototype part and slices it, by software as indicated at (10), into the sequence of layers (L) used to drive the remaining subsystems. This subsystem generates the process control signals (12) which drive the other subsystems of the apparatus, and monitors the whole process to ensure proper operation. This subsystem will generate part layers and controls based on operator preference and on minimizing process difficulties within the processing enclosure (14) such as part support problems, desired material properties issues, material matching problems, feature size constraints, material flow and shrinkage problems, and workspace constraints, all of which are diagnosed up front to allow for redesign of the part or reconfiguration of the apparatus. This system also provides mechanisms for in-process diagnoses, correction, and learning.

(2) Optional Mask Forming Subsystem

The optional mask forming subsystem 2, FIGS. 3A–3J, can provide preformed mask contours to reduce the amount of materials additive and/or subtractive processing required to attain the desired geometry for the part layer. If utilized (FIG. 1B), the mask formation subsystem produces masks for the deposition of the part materials. The mask functions as a control contour, not necessarily within tolerance, for the part materials to fill, thereby reducing the amount of additive processing required during the formation of the layer. This is described further in the hereafter presented materials additive and subtractive process subsystems 5 and 6, FIGS. 5A–5H and 6A–6B.

Furthermore, the mask contours, if made of complementary materials and left in place as support for the part contours, can significantly reduce the amount of complementary material that must be deposited to complete the layer. However, the masks may be made of materials other than complementary materials to suit the materials additive process. Nevertheless, the mask contours need to be formed and positioned accurately over the work surface. The use and precision (ranging from near net shape to gross contours) of preformed masks in the formation of layers is a process choice to be made.

The mask formation subsystem stores and delivers mask materials, and forms the mask contours maintaining mask handling and positioning control, and mask contour geometry.

Additionally, this subsystem performs mask enhancements and preparations which facilitate the use of masks in the other subsystems of the apparatus, including, positioning markers, coating and surface treatment, material flow pathways, and bridges and/or fixtures for islands.

(3) Part Processing Enclosure and Work Surface Subsystem

The part processing enclosure and work surface subsystem 3, FIG. 4, contains and manipulates the part as it is being built in the enclosure (14), one layer at a time. This subsystem provides access to the part and to the current work surface (layer) of the part to subsystems which monitor and/or operate on the part: including, for example, additive processes, subtractive processes, positioning and/or handling systems, and probing-/measurement systems.

(4) Environmental Control Subsystem

The environmental control subsystem 4, also in FIG. 4, maintains the proper environment for the subsystems of the apparatus as commanded by the computer and controls subsystem. The environmental variables which may be controlled include, temperature, pressure, inertness and other chemical conditions, cleanliness (debris and condensation), and vibration and noise.

(5) Materials Additive Subsystem

The materials additive subsystem 5, FIGS. 5A–5B, is comprised of the various additive processes for part and complementary materials. These processes deliver and deposit part materials within the geometric control provided by the respective apparatus and/or by control contours provided by selectively deposited and extracted complementary materials or by precut masks. In addition, these systems deposit complementary materials where necessary to complete the current layer.

The part materials additive processes have two phases: the primary deposition phase and the fusion bonding phase so-labeled in FIG. 5A. In the primary deposition phase, the material is deposited to a prespecified thickness on the work surface or only on selected discrete areas of the discretized (sectioned) work surface, such as shown in FIGS. 5C and 5D, respectively for radial and grid type discretization (sectioning). In the fusion bonding phase, FIG. 5H, it is ensured that a fusion bond occurs between the current and previous part layers and that the deposited material is energy treated to achieve a prespecified set of material properties (microstructure). Depending on the materials, the two phases may coincide and/or be achieved by the stone apparatus. The complementary materials additive processes may have two similar phases, but it is not required that a fusion bond be established: only that the complementary materials fill in empty areas and provide, as needed, structural support, chemical and/or thermal integrity, and a substrate for future layer adhesion.

Various additive processes are used within the materials additive subsystem and scheduled according to the process requirements by the computer and controls subsystem, (12) FIG. 2, to achieve prespecified final part qualities. Examples of materials additive processes include powder deposition and melting, FIG. 5F, plasma spaying and heat/energy beam glazing, FIG. 5E, molten material dispensing, and pre-cured material dispensing and curing with heat source/energy beam (preferably precured resin and/or sol-gel and tile like), FIG. 5G.

The materials additive subsystem incorporates surface heating, layer glazing, and rapid solidification as required for the various additive processes.

(6) Materials Subtractive Subsystem

The purpose of the materials subtractive, extractive, or removal subsystem 6, FIGS. 6A and 6B, is to remove part and complementary materials from the work surface as commanded by the computer and controls subsystem 1, FIG. 2. Laser or E-beam machining is shown in FIG. 6A, and milling or grinding and the like in FIG. 6B. This subsystem provides the final geometric accuracy of the contours after all the potential sources of geometric error on the layer such as bending/warping due to residual stress, shrinkage upon solidification, and distortion clue to layer processing (to achieve prespecified material properties within the layer and achieve interlayer fusion bonding), have already been introduced by the other subsystems. In other words, the other subsystems have all acted on the deposited layer such that all the physical and material properties of the layer such as material density and microstructure, and residual stresses are all within prespecified tolerances for the deposited contours. The materials subtractive subsystem then selectively removes the final materials, as specified by the respective contours for that layer from the computer and controls subsystem 1, without altering the prespecified physical and material parameters significantly.

The use of control contours in the additive process determines the amount of subtractive processing required to arrive within the geometric tolerance of the desired part layer. When no control contour is used, the entire part layer must be formed by the subtractive processing of the deposited part materials. Near net shape part layer contours in the mask reduces the amount of subtractive processing, as would a discretized materials additive process. After subtractive processing of the part contours, complementary materials are deposited by the materials additive subsystem into empty regions of the work surface.

(7) Interlayer Processing and Preparation Subsystem

The interlayer processing and preparation subsystem 7, FIG. 7, consists of work surface preparations performed between each part layer as required by the computer and controls subsystem 1, FIG. 2. These operations include surface treatment such as heating (18), toughening, grinding, leveling, etc. (16), addition of surfactants, binders, chemical barriers, alloying materials, etc. (20), and addition and/or configuration of fixtures.

(8) Part Post-processing Subsystem

The part post-processing subsystem 8, FIG. 8, performs finishing operations on the completed part after it is removed from the part chamber. Such operations include removal of complementary materials through oxidation or thermal/mechanical processes, FIG. 8A, and/or vaporization or dissolution, FIG. 8B, polishing, FIG. 8C, machining, heat treating, chemical treatment, coatings application, and assembly.

DETAILS OF OPERATION OF SUBSYSTEMS (1) THROUGH (8)

Referring to FIGS. 2–8C, the automated rapid prototyping method of the invention based on selective deposition/removal of materials is performed with the sequences of operation previously summarized in the flow charts of FIGS. 1A and 1B.

The computer and controls subsystem 1, FIG. 2, embodies, as the controls generator and system monitor (12), for example, a commercially available computer with CAD/CAM slicing software, a user interface, and I/O hardware by which to communicate with other subsystems. The slicing software exists commercially, such as, for example, the CAMAND and ULTRACAM products from CAMAX Systems Inc., and can readily be modified and extended, as is well known in the art, to provide expert diagnosis capabilities based on materials and process variables as well as learning capabilities.

Figure 3E:
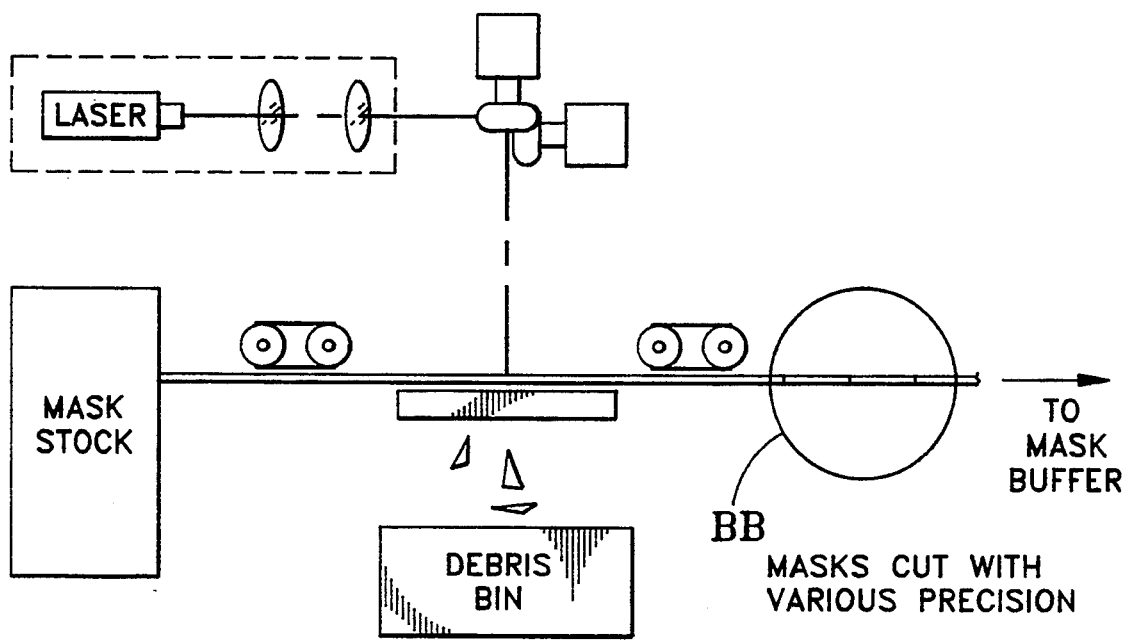
Figure 3F:
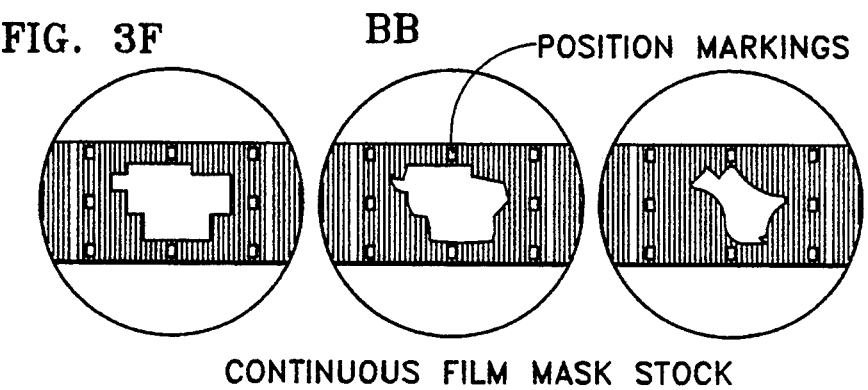
Figure 3G:
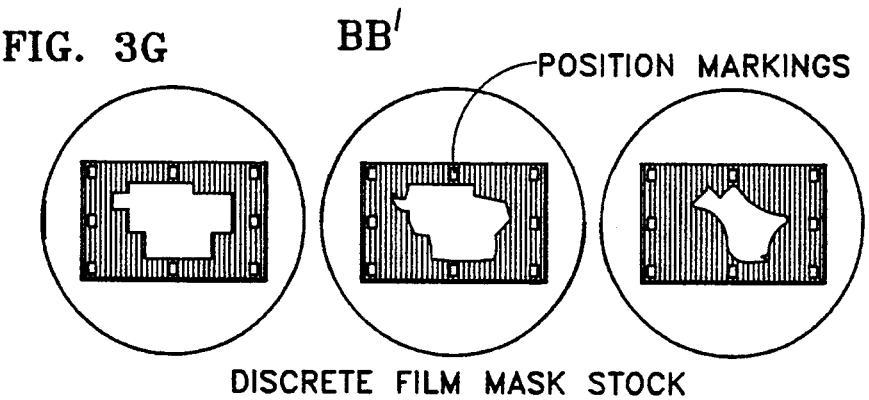
Figure 3H:
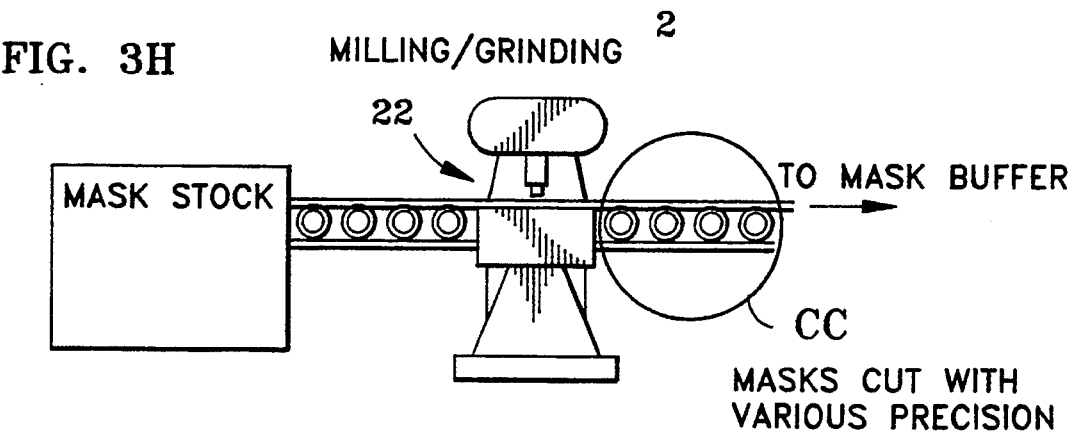
Figure 3I:
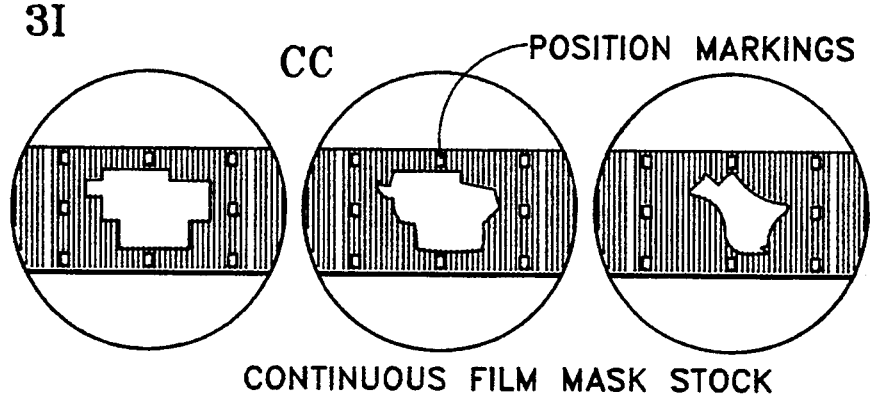
Figure 3J:
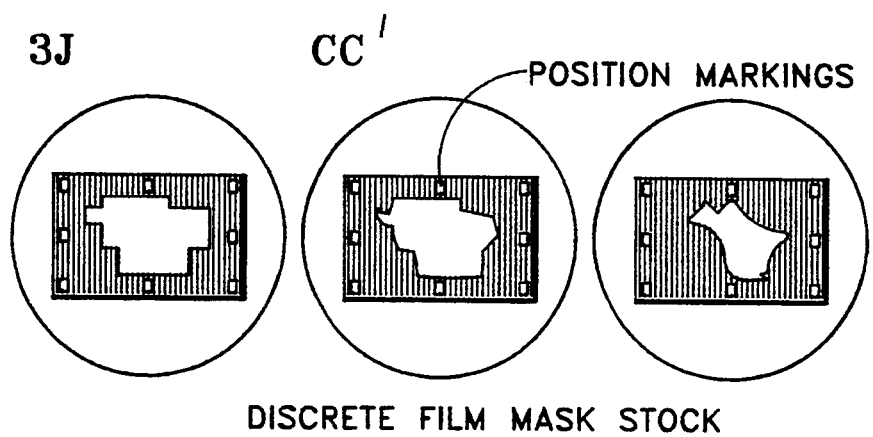

If utilized, the optional mask forming subsystem 2, FIGS. 3A–3J, may consist of a machining station (22), FIGS. 3A and 3E, at which continuous films or sets of sheets are laser cut, on a system such as the Landmark laser marking system of AB Lasers Co., or machined by milling, FIG. 3H, or punching to produce a precut contour for the part layer. The precut masks, if made of complementary material and left in place, can also serve as complementary material contours for each layer. Graphite films or sheets are one possible choice of complementary material precut masks, and may be used for high temperature applications such as with parts involving tool steels or ceramics since graphite has a high melting temperature. Graphite also oxidizes rapidly well below its melting point which facilitates removing the graphite complementary materials surrounding the finished part. Different choices of complementary material may also be made depending on the process requirements. These complementary materials may then be removed by a variety of processes including healing, oxidation, solution bathing, vibration, etc.. The mask stock may be in the form of a continuous film loaded into the apparatus and advanced accordingly, FIGS. 3A and 3B, 3E and 3F, and/or 3H and 3I, or in the form of discrete sheets loaded sequentially, FIGS. 3C and 3G, and/or 3J.

If utilized, the precut mask contours, FIGS. 3A–3J, may be rough cuts of the desired part contour so as to reduce subsequent subtractive processing and debris. Alternatively, the precut mask contours may be precision machined to within the tolerance of the desired part layer to minimize subsequent subtractive processing and debris. In general, the degree of precision in the mask formation process 2 would be at best equal to the precision of the materials subtractive process subsystem. Among the additional precut mask processing operations is the machining of the mask handling and positioning markings, FIGS. 3B, 3C, 3F, 3G, 3I and 3J, and the forming of removable bridges to any mask islands which were created intentionally in favor of employing subtractive processes in particular regions of the mask. If the precut masks are not intended to be left as support structure, contour factorization, FIG. 3D may be used to prevent mask islands. The finished precut masks are conveyed to a mask buffer, FIGS. 3A, 3E, and 3H, from which they are scheduled for accurate positioning, aligning, and flattening over the work surface in FIG. 4.

The environmental control subsystem, 4, and the part processing enclosure subsystem, 3, are shown in FIG. 4 as a sealed enclosure (4), with sensors, heaters/coolers, gas flow ducts and pumps, and windows, for directed energy beams and sensors. The part chamber preferably consists of a servo controlled piston in a cylinder encompassed in the lower chamber enclosure (14), and the current work surface, FIG. 4, is shown as the topmost surface within the cylinder. The part upper chamber processing enclosure (4), houses or provides access of the work surface to the environment control subsystem 4, the materials additive and subtractive processes subsystems 5 and 6, FIGS. 5A–5H and 6A and 6B, and the interlayer processing subsystem 7, FIG. 7.

In the embodiment of FIG. 4, the part chamber is mounted to a precision x-y-z positioning table, schematically represented by the 3-axis vector diagram, and the additive and subtractive subsystem apparatus are scheduled over the work surface. The convention is used herein of schematically showing the required positioning tables as an axis vector diagram, such apparatus being well known and deemed unnecessary to complicate the drawings herein.

In a modified embodiment the part chamber may be mounted to a precision x and/or y and/or z positioning table and each additive and/or subtractive processing apparatus may be capable of x-y and/or z-axis motion in addition the motion of the work surface.

In still another embodiment, tile part chamber may be fixed and the additive and/or tile subtractive apparatus are capable of precision x-y and/or z motion. The processing enclosure and part chamber may be kept at elevated temperatures to reduce thermal cycling, residual stresses, and facilitate the materials additive processes and the formation of quality interlayer bonds, and may provide an inert and clean environment via debris and contaminant removal. The processing enclosure and the part chamber may be capable of pressure cycling for materials additive processing, interlayer processing, and/or debris removal at (11), FIG. 4. Additionally, the processing enclosure and/or part chamber houses or provides access to material stock and mask buffers which supply the various processes inherent to part layer formation. The processing enclosure and chamber are designed and operated to regulate the level of oxygen, non-inert gasses (labeled "gas" in FIG. 4) and contaminants during the building of the part.

At the start of each layer one of two processing scenarios may be carried out based upon the particular embodiment and/or the volume fraction of part to complementary materials in the current layer.

Scenario One: Complementary material is selectively deposited first. Part material is subsequently deposited within the control contours provided by the complementary materials. Material processing operations before described, such as heating, chemical treating, or energy treating are then performed on the deposited part materials (and possibly complementary materials) contours by the materials additive system to ensure that the part (and possibly complementary) materials are within tolerance of prespecified material properties. Complementary material may be deposited by either placing a precut mask made of complementary material or selectively through the materials additive subsystem, and may be machined or selectively removed in addition. The precision of the precut mask contour and/or the complementary materials selective deposition apparatus is a parameter of the particular embodiment or apparatus.

Scenario Two: Part material is first selectively deposited. Complementary material may/may not be subsequently selectively deposited. Material processing operations such as heating, chemical treating, or energy treating are then performed on the deposited part material (and possibly complementary material) contours by the materials additive system to ensure that the part (and possibly complementary) materials are within tolerance of prespecified material properties. Part material may be deposited through a precut mask or selectively through the materials additive subsystem.

The controlled deposition and extraction of part and complementary materials, as stated scenarios One and Two, is repeated to include all part and complementary materials predetermined for the part layer. At this point in the process, the layer is at least partially covered by deposited part materials and/or complementary materials within tolerance of their respective prespecified material properties. The materials subtractive subsystem then processes the part contours to arrive within the specified geometric tolerance of the part. Next, the materials additive subsystem completes the layer by depositing complementary material in any empty regions of the current layer in order to complete the layer. Materials processing of this additional complementary material may/may not be performed by the materials additive subsystem. Interlayer processing such as layer thickness control by surface machining anti surface treatment and/or roughening, FIG. 7, is performed on the completed (aggregate)layer by the interlayer processing and preparation system in preparation for the next layer. All of the above occurs within a regulated environment dictated by the environment control subsystem 4, FIG. 4,. In a particular embodiment where the materials subtractive system is a laser machining system, the part contours may be surfaced machined in order to attain thickness tolerances before the materials subtractive system acts on the part contours.

In one version of tile invention as previously described, the primary deposition system may consist of a powder dispenser, FIG. 5F which deposits powder onto the work surface. A roller or squeegee-like mechanism (R), is used to regulate the powder layer height and a mask may be used, if so desired, to control the contour of the powder layer. Both the layer materials processing and fusion bonding systems, FIG. 5H, consist of a laser, such as the Diamond SL-64 made by Coherent General, electron beam, or other regional effect heat/energy source, and are employed within an appropriate environmental cycle (e.g. temperature and pressure) to ensure a dense, fusion bonded layer within tolerance of specified material properties, as is well known. This process adds both part and complementary materials to the work surface.

In a modified version, the primary deposition process may, as before described, consist of a powder or wire fed, multi-material plasma spraying system, FIG. 5E, (either multi-head or multi-material feeds) such as the SG-200 plasma spray gun based system made by Plasmadyne Co.. The plasma spraying parameters are chosen to regulate the layer height, and a mask may also be used, if so desired, to control the deposited contour. The bonding in the plasma sprayed layer may be partially mechanical and partially from fusion, depending on the choice of spraying parameters such as standoff distance, amperage, and gas velocity. To achieve predominantly fusion inter/intralayer bonding requires nontrivial spraying parameters, and thus a fusion bonding phase would preferably be utilized. The fusion bonding system consists of a laser or electron beam or other regional effect heat/energy source, FIG. 5H, and is employed within an appropriate environmental cycle (e.g. temperature and pressure, and gas concentration) to ensure a dense, fusion bonded layer within tolerance of its specified material properties. The additive processing of complementary materials need not include a fusion bonding phase provided that the plasma spraying parameters can be chosen to provide a suitable support structure. Additionally, rapid solidification mechanisms such as localized cooling devices may be used if required for good material properties.

In still another embodiment, the primary deposition phase, FIG. 5G, may embody the previously described powder or wire fed, molten material dispenser. Multiple heads or multiple material feeds allows for multiple material deposition. The molten materials dispensing parameters are chosen to regulate the layer height and a mask may also be used, if so desired, to control the layer contour. The fusion bonding system, FIG. 5H, as before, consists of a laser or electron beam or other regional effect heat/energy source and is employed within an appropriate environmental cycle (e.g. temperature, pressure, and gas concentrations) to ensure a dense, fusion bonded layer within tolerance of its specified material properties. The complementary materials additive process may employ either the molten materials dispenser or a plasma-spray head and may not require a full fusion bond to provide a suitable support structure.

In another modification, the primary deposition system, FIG. 5G, consists of a liquid dispenser for the before mentioned pre-cured resin or thermosetting materials or for materials in sol-gel or solution form (e.g. ceramics). The dispensing parameters are again chosen to regulate the layer height, and a mask may also be used, if so desired, to control the layer contour. The same fusion bonding system of FIG. 5H and/or a general heat source through the environmental control subsystem may be used to cure the thermoset or evaporate the solvent to ensure a dense, fusion bonded layer within tolerance of its specified material properties. Any of the above mentioned additive processing apparatus may be employed for the complementary materials depending on the choice of complementary material.

Upon formation of the layer with or without any masking, the precision subtractive processes of FIGS. 6A and 6B, are employed to attain the exact geometry of the desired part. The materials subtractive processes subsystem consists, as before stated, of precision machining systems such as: milling, drilling, routing, grinding, FIG. 6B, or laser or electron beam machining, FIG. 6A, or electrostatic discharge machining, as examples.

Each such system is capable of operating within the environment required by the computer and controls subsystem. To this end, liquid and/or gas coolant or high temperature tooling may be employed. The choice of subtractive process largely depends on the materials and environment and thus various processes may be scheduled according to need. Debris removal, as at (11), FIG. 4, is required to maintain a contaminant free environment in the part processing enclosure. Debris comes in the form of chips and/or loose powder and/or vapor and/or liquid from the various material deliveries, additive and subtractive processes, and possibly coolants.

Gas flows ("Gas", FIG. 4) may be used to blow material vapor, debris, and other unwanted products through gas ducts and filters such as in the model 1005/1310 Fume Exhauster and Filtered Air Cleaner by KEI. Gas flows may also be used to clear areas only on the work surface, as needed. Gas flows may also be induced by high pressure nozzles or by vacuum diffusers which are opened within the part processing enclosure during a high pressure cycle. The gas flows may be fixed locally to the subtractive processing apparatus to blow or suck debris as it is formed. More global gas flows may also be used to suck vapors out of the part processing enclosure with drainage paths employed to remove unvaporized liquids.

Subtractive processing the part layer to tolerance in FIGS. 6A and 6B, moreover, may create empty areas of the work surface which require filling with complementary material. The materials additive subsystem, FIG. 5A, discussed above, then accomplishes this task.

At this point in the process, the part (aggregate) layer is formed to tolerance in the work surface plane, but not necessarily in the vertical plane (height or thickness of the layer). The interlayer processing subsystem, FIG. 7, machines the completed layer to vertical tolerance (height) and surface-preps (roughening, adding alloying or bonding elements, chemical treating, etc.) the layer to facilitate the construction of the next part layer. In FIGS. 7A–7C, a part is shown in FIG. 7A comprising 3 part materials, as an example, with the aggregate layer being shown in expanded view in FIG. 7C for a particular part layer of FIG. 7B.

The sequences of operations outlined above are repeated until the entire part is built, as described in connection with the flow charts of FIGS. 1A and 1B. The finished part is surrounded by complementary material which must be removed. The previously mentioned graphite, for example, can be removed by rapid oxidation, while other complementary materials may be removed by thermal or mechanical shocking, chemical baths or melting as shown in FIGS. 8A–8C.

Complementary material may have a melting point below that of part material, and thus may be removed by heating. Complementary material may be soluble in an appropriate liquid or gas based solvent for removal, and indeed, may be soluble in water—such as a variety of inorganic salts, certain waxes, or water soluble aluminum alloys. The complementary material(s) may include glass materials such as a borosilicate, soluble, for example, in solvents such as acetone, or may include ceramic materials of the like. As before stated, if graphite or a graphite-based material is used, such oxidizes readily under appropriate heating and/or oxygen concentrations. Thermal and/or mechanical cycling and/or shocking, as previously mentioned, may also be used for removing the complementary material(s).

The invention is applicable to a wide variety of part materials including, as examples, metals and metallic alloys, thermoforming and thermosetting plastics, waxes, ceramics, glasses, graphites, and inorganics of various types, all such being depositable in multimaterial, composite layers, as described.

Further modifications will occur to those skilled in this art, and such as are considered to fall within the sphere and scope of the invention as defined in the appended claims.

What is claimed is:

1. A method of automated layerwise fabrication of a three-dimensional part from a computer model, through controlled deposition and extraction of materials, that comprises, producing a three-dimensional computer model representation of the part and, by software, slicing the representation into a plurality of successive layers corresponding to layers of predetermined thickness(es) of the part; generating sequences of part and complementary support material(s) contours corresponding to each layer; depositing material(s) for one or more of said contours onto a work surface within a processing enclosure; material(s) processing said deposited contour(s) in order to achieve prespecified material properties for part and complementary contours; removing portions of said material(s) from said part and complementary contour(s) under the control of the computer model representation corresponding thereto; repeating the depositing, processing, and removing as necessary under the control of the computer model corresponding to the layer to complete an aggregate layer comprising part material contours within prespecified geometric and material property tolerances and complementary material(s) elsewhere on the aggregate layer; completing the computer model layer by further processing said aggregate layer to ensure thickness tolerances and selective binding to the next aggregate layer; repeating said controlled layer creation steps to build the entire part surrounded by the complementary material/s; and removing said complementary material/s to obtain the fabricated part.

2. The method of claim 1 wherein the processing of said three-dimensional computer model into contours is done in a batch mode to obtain a full set of contours.

3. The method of claim 1 wherein the processing of said three-dimensional computer model for a given contour is performed as said given contour is needed by the process, with the slicing of the model occurring simultaneously with the part building.

4. The method of claim 1 wherein at least one of diagnostics and expert decision making are used to further process computer model data and define the computer model representation contours to facilitate the part-building process.

5. A method as claimed in claim 1 and in which the materials deposition is effected upon a pre-cut mask of complementary material, the cut of which corresponds to a corresponding software-slice contour, such that the mask is left in place as complementary support material toward the formation of the aggregate layer.

6. The method of claim 5 in which the precut masks are machined frames on a continuous film that advances over the work surface, or machined individual sheets that are sequentially positioned over the work surface.

7. The method of claim 5 in which a contour factorization approach is used such that there are no island contours for any given mask.

8. A method of claim 1 and in which the materials deposition is effected upon a pre-cut mask of material other than complementary material, and is removed prior to the formation of the aggregate layer.

9. The method of claim 1 in which a mask is formed by a conventional machining or a laser/energy beam machining system.

10. The method of claim 1 wherein at least one of the part and complementary sections which form the aggregate layer may consist of multiple materials.

11. The method of claim 1 wherein the deposition of material may be accomplished in discrete units corresponding to sections of a discretized work area.

12. The method of claim 1 wherein materials processing-and/or of the contours consists of heating the contours by one of conventional methods, laser/energy beam and/or chemically treating, mechanically processing the contours.

13. The method of claim 1 wherein inside the processing enclosure one of a prespecified temperature profile and/or pressure profile, gas concentration profile, chemical profile and/or vibration profile is maintained over the work surface.

14. The method of claim 1 wherein solid, liquid, and gaseous contaminants/debris is maintained within prespecified levels within the processing enclosure.

15. The method of claim 1 wherein the work surface is maintained at a constant level relative to ground plane by defining the work surface as the top of a cylinder which is indexed down or up a prespecified amount after each layer is completed.

16. The method of claim 1 wherein the work surface consists of the top layer of the part where the part is being built on a stationary platform.

17. The method of claim 1 wherein one of the work surface and/or the materials deposition system, materials extraction system, interlayer processing system is capable of X,Y and/or Z motion.

18. The method of claim 1 wherein material is deposited via a molten material dispensing unit.

19. The method of claim 18 wherein the molten material dispensing involves dispensing molten material and mechanically aiding the binding of the molten material to the work surface, while adjusting temperature to control solidification of the deposited material.

20. The method of claim 18 wherein the molten material dispensing involves feeding materials in solid form as powder or wire and melting the material for subsequent molten deposition, with or without a reservoir of molten material.

21. The method of claim 18 wherein selective cooling is accomplished by one of a thermoelectric cooler, a flowing liquid, gas cooler, by directly blowing gas on the molten material.

22. The method of claim 1 wherein materials are deposited by thermal spraying such as arc and plasma spraying with subsequent additional fusion bonding effected by one of regional energy/heat profiles and by regional chemical processes.

23. The method of claim 1 wherein the materials are deposited by one of chemical and electrochemical processes, thermosetting material is dispensed in a precured state onto the work surface, and cured by regional heat, material dispensed in a sol-gel/liquid solution state onto the work surface, and reduced-/evaporated by regional heat.

24. The method of claim 1 wherein the material being deposited is selected from the group consisting of metals, plastics, waxes, ceramics, alloys, composites, graphite's, glasses and inorganics.

25. The method of claim 1 in which the removal of materials is accomplished through one of conventional machining, and/or selected energy delivery and chemical/electrochemical machining.

26. The method of claim 1 wherein the processing enclosure, the removal of any debris or contaminants is accomplished through one of gas transport, liquid transport and/or magnetism and/or gravity and/or chemical dissolution and/or vaporization, combinations thereof.

27. The method of claim 1 wherein processing of the aggregate layer in order to achieve one of a prespecified layer thickness, enhanced material properties and binding is accomplished by one of conventional machining, selective energy delivery, and chemical/electrochemical machining.

28. The method of claim 1 wherein the complementary material is of lower melting temperature than the part material and can be removed by heating to a temperature greater than the melting point of the complementary material but less than the melting point of the part material.

29. The method of claim 1 wherein the complementary material is soluble in a solvent and can be removed through contact with the solvent.

30. The method of claim 29 wherein the complementary material is soluble in water such as a variety of inorganic salts, waxes and water soluble aluminum alloys.

31. The method of claim 29 wherein the complementary material is a glass such as borosilicate and is soluble in a solvent such as acetone, or a ceramic and is soluble in a variety of solvents.

32. The method of claim 1 wherein the complementary material is material that oxidizes rapidly under conditions that are non detrimental to the part material.

33. The method of claim 32 wherein the complementary material is a graphite based material that oxidizes rapidly under appropriate temperature and oxygen concentration levels.

34. The method of claim 1 wherein the complementary material is removable by one of thermal, mechanical cycling and/or shocking, by heating and/or a solution bath and induced rapid oxidation.

35. The method of claim 1 wherein the further processing is effected by at least one of machining off a sublayer to ensure thickness tolerances, roughening, polishing, surface heat treatment, surface alloying, and chemically enhancing the surface to ensure selective binding.

36. Apparatus for automated layerwise fabrication of a three-dimensional part from a computer model, through controlled deposition and extraction of materials having, in combination, means for producing a three-dimensional computer model representation of the part and, by software, slicing representation into a plurality of successive layers corresponding to layers of predetermined thickness(es) of the part; means for generating sequences of part and complementary support material(s) contours corresponding to each layer; means for depositing material(s) for one or more of said contours onto a work surface within a processing enclosure; means for materials(s) processing said deposited contour(s) in order to achieve prespecified material properties for part and complementary contours; means for removing portions of said material(s) from said part and complimentary contour(s) under the control of the computer model representation corresponding thereto; means for repeating the depositing, processing, and removing as necessary under the control of the computer model corresponding to the layer to complete an aggregate layer comprising part material contours with prespecified geometric and material property tolerances and complementary material(s) elsewhere on the aggregate layer; means for completing the computer model layering by further processing said aggregate layer to ensure thickness tolerances and selective binding to the next aggregate layer to build the entire part surrounded by the complementary material(s); and means for removing said complementary material(s) to obtain the fabricated part.

* * * * *

UNITED STATES PATENT AND TRADEMARK OFFICE
CERTIFICATE OF CORRECTION

| | | |
|---|---|---|
| PATENT NO. | : 5,398,193 | Page 1 of 1 |
| APPLICATION NO. | : 08/110144 | |
| DATED | : March 14, 1995 | |
| INVENTOR(S) | : Alfredo O. DeAngelis | |

It is certified that error appears in the above-identified patent and that said Letters Patent is hereby corrected as shown below:

Title Pg

Add inventor:  Franco E. DeAngelis, 12900 Wood Crescent Circle, Herndon, Virginia 20171

Signed and Sealed this

Nineteenth Day of January, 2010

David J. Kappos
*Director of the United States Patent and Trademark Office*

REEXAMINATION CERTIFICATE (3329th)

United States Patent [19]
deAngelis

[11] B1 5,398,193
[45] Certificate Issued Sep. 16, 1997

[54] METHOD OF THREE-DIMENSIONAL RAPID PROTOTYPING THROUGH CONTROLLED LAYERWISE DEPOSITION/EXTRACTION AND APPARATUS THEREFOR

[76] Inventor: Alfredo O. deAngelis, 241 Freeman St. #1, Brookline, Mass. 02146

Reexamination Request:
No. 90/004,179, Mar. 12, 1996

Reexamination Certificate for:
Patent No.: 5,398,193
Issued: Mar. 14, 1995
Appl. No.: 110,144
Filed: Aug. 20, 1993

[51] Int. Cl.$^6$ ............... G06F 19/00; B29C 35/08
[52] U.S. Cl. ............... 364/468.26; 364/474.24; 364/468.25; 395/119; 264/241; 425/141
[58] Field of Search ............... 364/468.03, 474.24, 364/468.25, 468.26; 395/118, 119; 264/10, 239, 241; 425/141

[56] References Cited

U.S. PATENT DOCUMENTS

| | | | |
|---|---|---|---|
| 4,665,492 | 5/1987 | Masters | 364/468 |
| 5,126,529 | 6/1992 | Weiss et al. | 219/121.6 |
| 5,203,944 | 4/1993 | Prinz et al. | 156/247 |
| 5,207,371 | 5/1993 | Prinz et al. | 228/125 |
| 5,278,442 | 1/1994 | Prinz et al. | 257/417 |
| 5,281,789 | 1/1994 | Merz et al. | 219/76.15 |
| 5,286,573 | 2/1994 | Prinz et al. | 428/457 |
| 5,301,415 | 4/1994 | Prinz et al. | 29/458 |
| 5,301,863 | 4/1994 | Prinz et al. | 228/33 |

FOREIGN PATENT DOCUMENTS 0 322 257 A3  6/1989  European Pat. Off. .

*Primary Examiner*—Paul P. Gordon

[57] ABSTRACT

A method of rapid prototyping through controlled layerwise deposition and extraction involving the precision control of material subtractive or removal processes in conjunction with material additive processes wherein each layer is formed by selectively depositing and removing portions of the layers in accordance with corresponding software slices of a computer model of the prototype part, and with complementary support material included in the layers and ultimately removed when the complete part has been fabricated.

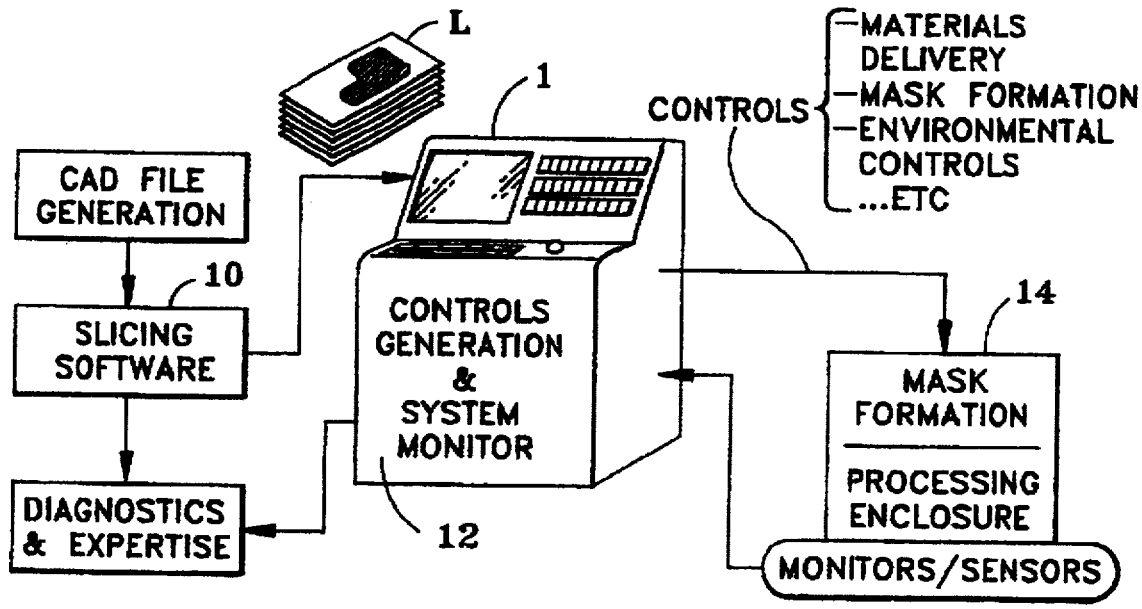

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–35 and 36 is confirmed.

* * * * *